US008634875B1

(12) United States Patent
Narayanachar

(10) Patent No.: US 8,634,875 B1
(45) Date of Patent: Jan. 21, 2014

(54) ADDRESS BOOK MANAGEMENT METHOD AND USER INTERFACE

(75) Inventor: Nagesh Narayanachar, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 997 days.

(21) Appl. No.: 11/608,181

(22) Filed: Dec. 7, 2006

(51) Int. Cl.
*H04M 3/42* (2006.01)
*H04M 1/00* (2006.01)

(52) U.S. Cl.
USPC ...... 455/566; 455/416; 455/550.1; 455/556.2

(58) Field of Classification Search
USPC ........... 455/458–558, 412.1–412.2, 415–416, 455/418, 432.3, 550.1, 566–567; 709/200–210
See application file for complete search history.

(56) References Cited

U.S. PATENT DOCUMENTS

| | | | | |
|---|---|---|---|---|
| 4,908,853 | A * | 3/1990 | Matsumoto | 379/355.09 |
| 6,175,741 | B1 * | 1/2001 | Alperovich | 455/458 |
| 6,349,220 | B1 * | 2/2002 | Prior et al. | 455/566 |
| 6,363,264 | B1 * | 3/2002 | Overy et al. | 455/566 |
| 6,593,949 | B1 * | 7/2003 | Chew et al. | 715/841 |
| 7,047,503 | B1 * | 5/2006 | Parrish et al. | 715/863 |
| 7,278,116 | B2 * | 10/2007 | Bosma et al. | 715/845 |
| 2003/0078981 | A1 * | 4/2003 | Harms et al. | 709/206 |
| 2003/0148790 | A1 * | 8/2003 | Pappalardo et al. | 455/558 |
| 2004/0042599 | A1 * | 3/2004 | Zaner et al. | 379/144.01 |
| 2005/0233697 | A1 * | 10/2005 | Yu | 455/41.3 |
| 2006/0080386 | A1 * | 4/2006 | Roykkee et al. | 709/203 |

OTHER PUBLICATIONS

The document provided by the applicant as prior art entitled "Using Your Palm® Treo™ 700w Smartphone" and referred to in the applicant's IDS as (Users Guide for Treo 700w).*
Internet document: "User Guide for Treo 700w" at http://www.palm.com/us/support/handbooks/treo/treo700wvzw_ug.pdf (accessed Mar. 13, 2007).
Internet document: "User Guide for Blackberry Wireless Handheld 8700", Chap. 2-5 & 14, at http://www.blackberry.com (accessed Mar. 13, 2007).

* cited by examiner

*Primary Examiner* — Meless Zewdu

(57) ABSTRACT

An exemplary mobile communication device comprises a processor, a memory coupled to the processor, a display coupled to the processor, a transceiver coupled to the processor, an antenna coupled to the transceiver, a user interface coupled to the processor for receiving inputs from a user, and software executed by the processor for performing a method for managing a plurality of contact entries of an address book stored on the memory. The method comprises displaying a list of contact entries on the display, displaying a toggle value corresponding to each contact entry displayed on the display, receiving an input for selecting or deselecting a particular toggle value for a particular contact entry, receiving a command input for the execution of a function on the address book, and executing the function associated with the command input for each contact entry that has a selected toggle value.

21 Claims, 3 Drawing Sheets

ADDRESS BOOK MANAGEMENT METHOD AND USER INTERFACE

TECHNICAL FIELD

The present invention relates to the field of wireless communication devices. More specifically, the invention relates to address book management on mobile wireless communication devices.

BACKGROUND

A typical wireless communication device, such as a mobile phone, comprises, among other things, a processor coupled to a memory and to a transceiver, each enclosed in a housing. A mobile power source, such as a battery, is coupled to and supplies power to the processor, the memory and the transceiver. A speaker and a microphone are also enclosed within the housing for transmitting and receiving, respectively, acoustic signals to and from a user of the wireless communication device. The wireless communication device communicates information by transmitting and receiving electromagnetic ("EM") energy in the radio frequency ("RF") band via an antenna coupled to the transceiver.

Mobile phones are typically characterized by their small form factor, making storage and portability convenient for the user. Unfortunately, a mobile phone's small form factor is commonly accompanied by limitations inherent to its physical dimensions, such as reduced memory size, reduced battery life, and reduced input/output (I/O) capabilities, such as reduced keys for input and control. These limitations often render the mobile cumbersome for such common tasks as data entry, data management, and the like.

SUMMARY

Disclosed herein is an address book management technique and user interface which addresses the limitations in conventions mobile phone implementations. Data management in the communication devices, especially in mobile communication devices has been a matter of significant concern for years. Efforts are being taken while designing the communication device to make the data management technique more user friendly. The technique disclosed involves a method for managing the information, and, particularly address book information, in the mobile communication device with more efficiency and ease of use.

According to one embodiment, a mobile communication device comprises a processor, a memory coupled to the processor, a display coupled to the processor, a transceiver coupled to the processor, an antenna coupled to the transceiver, a user interface coupled to the processor for receiving inputs from a user, and software executed by the processor for performing a method for managing a plurality of contact entries of an address book stored on the memory.

According to one embodiment, the method comprises displaying a list of contact entries on the display, displaying a toggle value corresponding to each contact entry displayed on the display, receiving an input for selecting or deselecting a particular toggle value for a particular contact entry, receiving a command input for the execution of a function on the address book, and executing the function associated with the command input for each contact entry that has a selected toggle value. In certain embodiment, the method further comprises updating the toggle value for the particular entry after receiving the input for selecting or deselecting the toggle value, and updating the displayed list on the display to reflect the updated toggle value for the particular entry. In certain embodiments, the user may be prompted with a message on the display to confirm the execution of the function prior to executing the function.

In one embodiment, the toggle value and a reference for its corresponding contact entry are stored in a temporary table in memory. In this particular embodiment, executing the function involves iterating through each record of the temporary table, and executing the function for each contact entry identified in the temporary table by a selected toggle value. Thus, the function is performed on each selected contact entry as a bulk or collective step.

Other features and advantages of the present invention will become more readily apparent to those of ordinary skill in the art after reviewing the following detailed description and accompanying drawings.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION OF THE INVENTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The preferred embodiments of the present invention are described with reference to the accompanying drawings. The following description and drawings are illustrative of the invention and are not to be construed as limiting the invention. Numerous specific details are described to provide a thorough understanding of the present invention. However in certain instances well-known or conventional details are not described in order not to unnecessarily obscure the present invention in detail.

Figure 1:
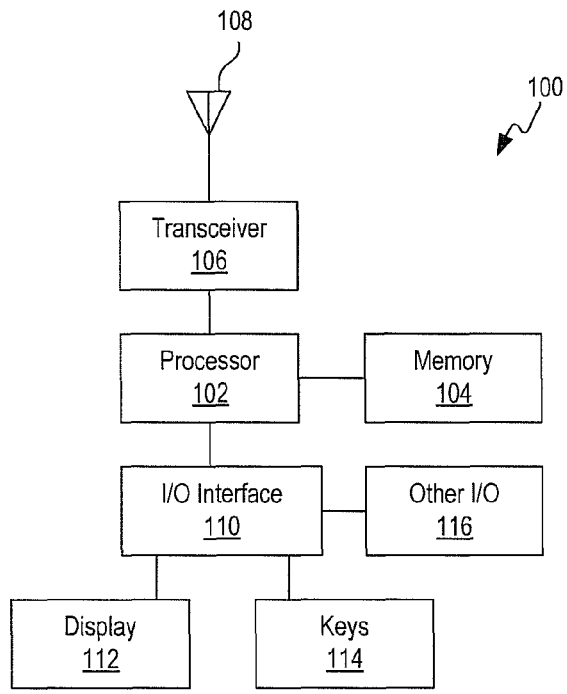
FIG. 1 illustrates an exemplary mobile wireless communication device according to an embodiment of the present invention.

Referring first to FIG. 1, there is shown exemplary mobile wireless communication device 100 according to one embodiment of the present invention. By way of example, wireless communication device 111 may be a mobile phone capable of communicating RF signals in one or more frequency bands.

As shown in FIG. 1, wireless communication device 100 comprises processor 102 coupled to memory 104 and to transceiver 106, each mounted within a housing. A mobile power source (not shown), such as a battery, supplies power to various components of wireless communication device 100. Transceiver 106 is further coupled to antenna 108 for transmission and reception of RF signals. Processor 102 is further coupled input/output (I/O) interface 110 for receiving and/or transmitting data to the user via various I/O devices, such as display 112, input keys 114 and other I/O devices 116, such as a speaker and microphone, for example.

Figure 2:
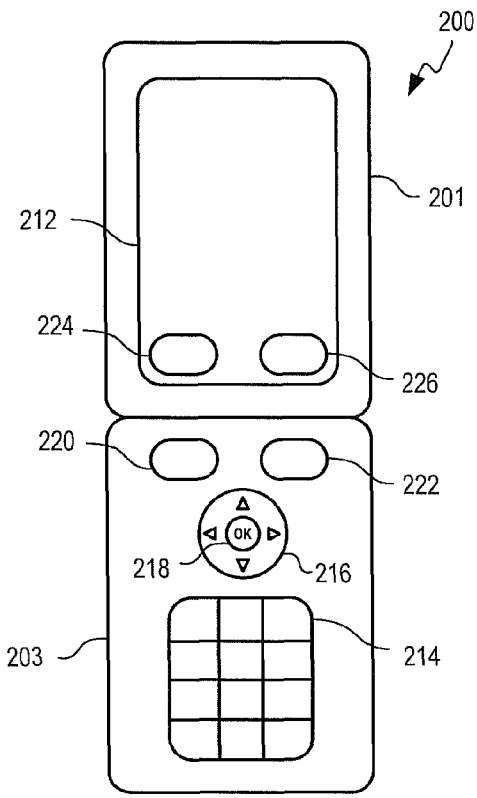
FIG. 2 illustrates exemplary user-interface components of a mobile wireless communication device according to an embodiment of the present invention.

Referring now to FIG. 2, exemplary wireless communication device 200 according to one embodiment of the present invention is shown. In FIG. 2, top and the bottom housing portions of a clamshell arrangement are shown by 201 and 203 respectively. It is noted that the invention may be used with other housing designs, such as slidable-connected housing and bar phone housing, for example. Top housing portion 201 includes display 212. Soft keys 224 and 226 may be displayed on display 212 and can be assigned to one of various executable functions at a time. Bottom housing portion 203 includes numeric keypad 214, navigation keypad 216 along with OK button 218. In the embodiment shown in FIG. 2, key 220 is associated with soft key 224 and the key 222 is associated with soft key 226.

Figure 3:
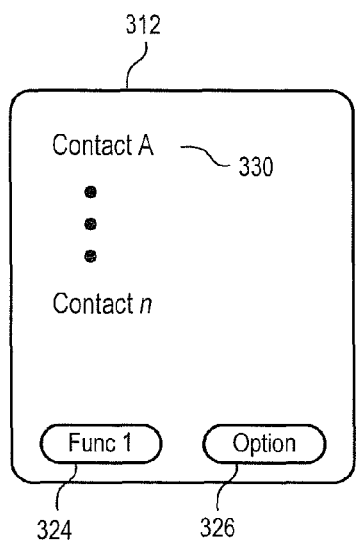
FIG. 3 depicts the screen display of a contact list including a plurality of contacts from an address book stored in the memory of a mobile communication device.

FIGS. 3 through 6 illustrate exemplary screen displays during operation of the mobile communication device 200 according to an embodiment of the present invention. FIG. 3 depicts the screen display 312 of a contact list including a plurality of contacts, such as contact A 330, from an address book stored in the memory of mobile communication device 200. Although not shown, the contact list will typically identify the name of the person or entity associated with each entry. In addition, associated contact information may also be provided, such as address, phone number, email address, for example. In screen display 312, soft key 324 is shown associated with "function 1," and soft key 326 is shown associated with an "option" command. Function 1 can, for example, be "call," "send message," or "delete." As discussed above, key 220 of device 200 may be associated with soft key 324 and can be activated by a user of device 200 for invoking "function 1." Similarly, key 222 of device 200 may be associated with soft key 326 and can be activated by a user of device 200 for invoking the "option" command.

Figure 4:
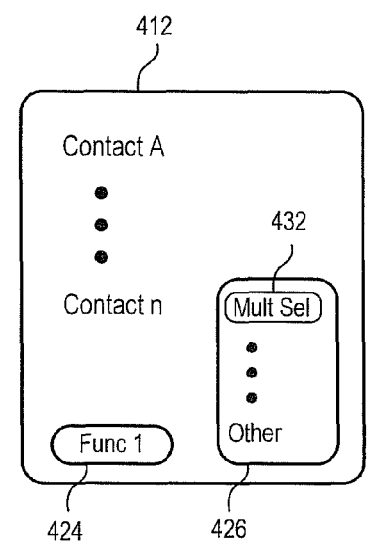
FIG. 4 depicts a screen display where the "option" command has been invoked so that a plurality of functions may be displayed in a list form to the user.

FIG. 4 depicts screen display 412, where the "option" command has been invoked or activated. When the "option" command is invoked, a plurality of functions may be displayed in a list form to the user. In screen display 412, for example, "multiple selection" 432 may be one of the functions available upon invoking "option" soft key 426. Typically, the user, using the navigation key 216, can scroll or navigate the individual items on the list. The current selection can be indicated in any number of ways, e.g., highlighting, circling, underlining, pointer indicator, or typeface (bold, italics, fonts, colors, etc.) indicator. The user can invoke a specific function after selection by activating OK button 218. Thus, the user can activate multiple selection mode by selecting "multiple selection" 432 from screen display 412.

Figure 5:
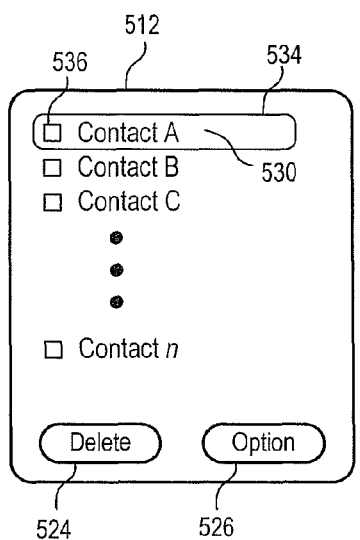
FIG. 5 depicts a screen display of a contact list where each of the contacts is associated with a corresponding toggle value to indicate selection or non-selection of the particular contact entry.
Figure 6:
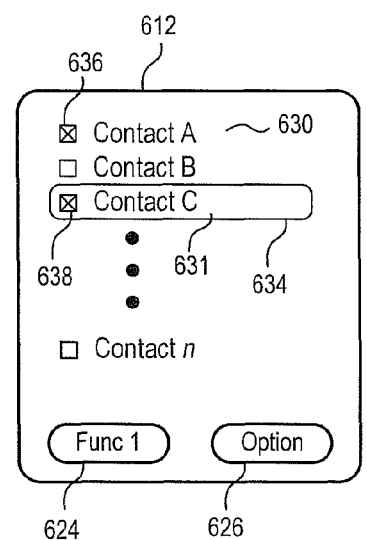
FIG. 6 depicts a screen display where a user has set the toggle value for Contact A and Contact C to the selected state.

FIGS. 5 and 6 depict screen displays 512 and 612, respectively, upon activation of multiple selection mode. In screen display 512 of FIG. 5, a contact list including a plurality of contacts is displayed, such as contact A 530, for example. Each of the contacts is associated with a corresponding toggle value to indicate selection or non-selection of the particular contact entry. In screen display 512, the status of the toggle value is represented by a checkbox, although other screen indicators may also be used, such as highlighting, circling, underlining, pointer indicators, or typeface (bold, italics, fonts, colors, etc.) indicators, for example. By way of illustration, checkbox 536 is associated with contact A 530, where a selected state is indicated by a "checked" or "marked" checkbox 536 and a non-selected state is indicated by an "un-checked" or "un-marked" checkbox 536. The user, using navigation key 216, can scroll or navigate through the individual contacts on the contact list, where the currently navigated contact can be indicated by highlight 534, although other selection indicators may also be used, such as circling, underlining, pointer indicators, or typeface (bold, italics, fonts, colors, etc.) indicators, for example. The user is able to select or deselect the toggle value for the currently navigated contact by activating the OK button 218. Other input techniques may also be used for navigating the contact list and selecting or deselecting the toggle value, such as via voice input, touchscreen, or other keys, such rocker keys, scroll keys, and jog dials, for example.

FIG. 6 shows screen display 636, where the user has set the toggle value for contact A 630 and contact C 631 to the selected state. The selected states of contacts 630 and 631 are depicted by "checked" or "marked" boxes for each check box 636 and 638. Also shown in display 636 are soft keys 612 corresponding to a delete function and soft key 626 corresponding to an "option" command. If the user activates soft key 612, e.g., by activating key 220, the delete function will be applied to each contact in the contact list that has its toggle value in the selected state (e.g., contacts 630 and 631). If the user activates soft key 626, e.g., by activating key 222, a plurality of functions may be displayed in a list form to the user as discussed above in conjunction with FIG. 4. Example functions that may be listed on the option list include "define ring tone," "assign picture," and "send vCard," for example. vCard is a file format standard for personal data interchange, specifically electronic business cards. vCards contain such information as name and address information, phone numbers, URLs, logos, photographs, and audio clips, for example. If the user selects one of the functions of the option list, the selected function will be applied to each contact in the contact list that has its toggle value in the selected state (e.g., contacts 630 and 631). The details of carrying out a particular function for each "selected" contact is discussed in greater detail conjunction with FIG. 7.

Figure 7:
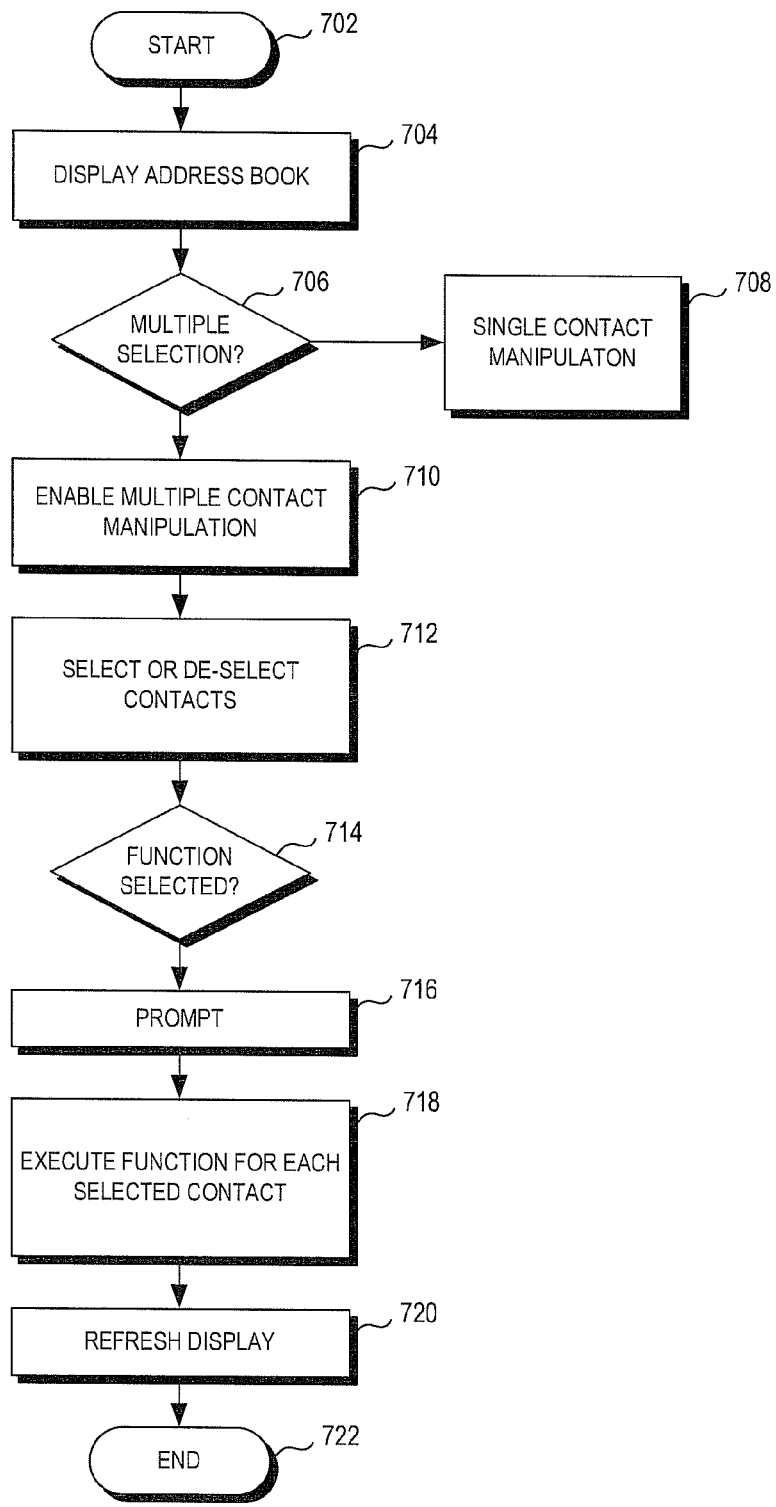
FIG. 7 is a flow chart illustrating an exemplary address book management method according to an embodiment of the present invention.

FIG. 7 depicts flowchart 700 for an exemplary method for performing address book management in mobile communication device 200 of FIG. 2 according to one embodiment. Certain details and features have been left out of flow chart 700 of FIG. 7 that are apparent to a person of ordinary skill in the art. For example, a step may consist of one or more sub-steps as known in the art. While steps 702 through 722 shown in flow chart 700 are sufficient to describe one embodiment of the present invention, other embodiments of the invention may utilize steps different from those shown in flow chart 700.

Method 700 begins at step 702, typically when the user invokes the address book application of mobile communication device 200. At step 704, the address book contents are displayed, typically as a list of contacts on display 212. As described above, the contact list will typically identify the name of the person or entity associated with each entry. In addition, associated contact information may also be provided, such as address, phone number, email address, for example.

At step 706, a determination is made as to whether the user of mobile communication device 200 has invoked multiple selection mode. Multiple selection mode can be invoked by user in a variety of ways, including choosing the function from a menu, as discussed above in conjunction with FIG. 4. In other embodiments, activation of multiple selection mode can be invoked using other techniques, such by activation of a dedicated key, activation via a voice command, selection from an application menu, or by detection of a setting or preference in the memory of the device, for example. If multiple selection mode is not invoked, the device operates in a single contact manipulation mode at step 708, where each contact is manipulated one by one.

If multiple selection mode is invoked, step 710 is carried out to enable multiple selection manipulation mode for the address book. As discussed above in conjunction with FIGS. 5 and 6, in multiple selection mode, each of the contacts is associated with a corresponding toggle value to indicate selection or non-selection of the particular contact entry. In screen display 512 of FIG. 5, for example, the status of the toggle value is represented by a checkbox, although other screen indicators may also be used. In memory, a temporary table in memory may be used to associate each contact with it corresponding toggle value. For example, a table may reference a contact ID with a toggle flag for each contact entry of an address book. For example, the toggle flag may be a Boolean field, although other data types are also suitable for identifying the toggle state.

At step 712, the user is able to select or deselect individual contacts on the contact list. For example, in screen 612 of FIG. 6, the user has selected Contact A 630 and contact C 631. The selection of these contacts is indicated on screen 612 by a "checked" or "marked" indication for each of checkbox 636 and 638, although other indicia may also be used, as described above. In the example embodiment where the toggle value is defined as a Boolean type, a "selected" status for a given contact may be represented by a "true" value, and a "non-selected" status for a given contact may be represented by a "false" value.

At step 714, a determination is made as to whether the user has invoked a function to perform on the "selected" contact entries. As discussed above, the user may select functions by way of soft keys, although other means for invoking functions may also be used, e.g., selection from a menu, voice activation, or dedicated function keys. Exemplary functions that the user may select include, but are not limited to, delete, define ring tone, assign picture, send vCard. Generally, step 712 continues until the user invokes a function to perform on the "selected" contact entries (or otherwise terminates the address book application or manipulation in any number of ways as would be known to one skilled in the art) as depicted by return path to step 712.

At step 716, the user may be prompted to confirm that the user would like to execute the requested function on the "selected" contact entries. In other embodiments, step 716 may be omitted and the method may continue to step 718 without prompting the user.

At step 718, the selected function is carried out for each "selected" contact entry. In one embodiment, the method iterates through each entry of the table cross referencing each contact with its associated toggle value. During this iteration, if the toggle value is determined as selected (e.g., "true" for a Boolean data type), the requested function is executed with respect the contact entry associated with that toggle value. For example, if the delete function is selected, the contact entry associated with the contact ID is deleted from the address book. The delete function is executed for each "selected" contact entry. Advantageously, the user is able to multiply select a number of contact entries and perform the delete function against the selected contact entries in a "bulk" or "collective" step. Thus, the user is spared the burden of having to individual select and delete individual contact entries, rending the address book management experience much more user-friendly.

In another example, if the assign ring tone function or assign picture function is selected, the user may be prompted to select the ring tone or picture from a list. In response to the user's selection, each contact entry that has a toggle value indicting selection by the user will be assigned the user-selected ring tone or picture in a bulk or collective step. Again, the user is spared the burden of having to individual select and assign the same ring tone or picture to individual contact entries, rending the address book management experience much more user-friendly.

In another example, if the send vCard function is selected, each contact entry that has a toggle value indicting selection by the user will be sent a vCard in a bulk or collective step. The vCard may be the user's vCard or may be based a vCard selected by the user, such as one selected from the current address book. Thus, the user is spared the burden of having to individual select and send the same vCard to individual contact entries, rending the address book management experience much more user-friendly. The vCard data can be transmitted using one or more data transmission techniques, including text messaging and multimedia messaging, for example, and over one or more network technologies, such as via wide area networks or cellular networks, via local area network connections, such as IEEE 802.11 networks, or via personal area networks, such as Bluetooth, for example.

At step 720, the contact list display may be refreshed to show the updated contents of the address book pursuant to the function carried out during step 718. At step 722, method 700 is concluded.

The invention therefore allows the user to manage the address book and the various associated operations in a more user-friendly and efficient way. By the use of multiple selection technique as described herein, the user is capable of pursuing common tasks for the desired number of contact entries in a bulk or collective step. The tedious and time consuming procedure of performing an executable function for a plurality of entries one by one can thus be avoided, resulting in a much more enjoyable user experience in operating mobile communication device 200.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for managing contact entries of an address book in a mobile communication device including a memory and a display, the method comprising:
   displaying a list of contact entries on the display;
   displaying an option soft key on the display;
   receiving a selection of the option soft key;
   displaying a plurality of modes in response to said selection;
   activating a multiple contact selection mode of the displayed plurality of modes that enables manipulation of the multiple contact selection mode for the address book;
   displaying a selection indicator corresponding to each contact entry of said contact entries displayed on the display, the selection indicator comprising a toggle value indicating whether the contact corresponding to the selection indicator has been selected, wherein the selection indicator is displayed regardless of whether the contact has been selected or not, and further wherein the selection indicator corresponding to each contact entry of said contact entries is not displayed when the multiple contact selection mode is not active;
   receiving a plurality of inputs, wherein each input of said plurality of inputs is associated with selecting a particular toggle value for a particular contact entry of said contact entries;
   receiving a command input to execute a function on the address book, wherein the command input is associated with the plurality of inputs; and
   executing the function associated with the command input for the plurality of inputs.

2. The method of claim 1, further comprising updating the particular toggle value for the particular contact entry of said contact entries after receiving the particular input for selecting the particular toggle value.

3. The method of claim 2, further comprising updating the displayed list on the display to reflect the updated particular toggle value for the particular contact entry of said contact entries.

4. The method of claim 1, further comprising prompting a user to confirm that the user would like to execute the function prior to executing the function.

5. The method of claim 1, wherein a toggle value and a reference for its corresponding contact entry are stored in a temporary table in the memory.

6. The method of claim 5, wherein the executing the function further comprises:
   iterating through each record of the temporary table; and
   executing the function for each contact entry identified in the temporary table by a selected toggle value.

7. The method of claim 1, wherein the function comprises a delete function.

8. The method of claim 1, wherein the function comprises assigning a picture.

9. The method of claim 1, wherein the function comprises assigning a ring tone.

10. The method of claim 1, wherein the function comprises sending an electronic business card.

11. A mobile communication device comprising:
   a processor;
   a memory coupled to the processor;
   a display coupled to the processor;
   a transceiver coupled to the processor;
   an antenna coupled to the transceiver;
   a user interface coupled to the processor for receiving inputs from a user;
   wherein the processor is configured to:
      display a list of contact entries on the display;
      display an option soft key on the display;
      receive a selection of the option soft key;
      display a plurality of modes in response to said selection;
      activate a multiple contact selection mode of the displayed plurality of modes that enables manipulation of the multiple contact selection mode for the address book;
      display a selection indicator corresponding to each contact entry of said contact entries displayed on the display, the selection indicator comprising a toggle value indicating whether the contact corresponding to the selection indicator has been selected, wherein the selection indicator is displayed regardless of whether the contact has been selected or not, and further wherein the selection indicator corresponding to each contact entry of said contact entries is not displayed when the multiple contact selection mode is not active;
      receive a plurality of inputs, wherein each input is associated with selecting a particular toggle value for a particular contact entry;
      receive a command input to execute a function on the address book, wherein the command input is associated with the plurality of inputs; and
      execute the function associated with the command input for the plurality of inputs.

12. The device of claim 11, wherein the processor is further configured to update the particular toggle value for the particular contact entry of said contact entries after receiving the particular input for selecting the particular toggle value.

13. The device of claim 12, wherein the processor is further configured to update the displayed list on the display to reflect the updated particular toggle value for the particular contact entry of said contact entries.

14. The device of claim 11, wherein the processor is further configured to prompt the user to confirm that the user would like to execute the function prior to executing the function.

15. The device of claim 11, wherein a toggle value and a reference for its corresponding contact entry are stored in a temporary table in the memory.

16. The device of claim 15, wherein the processor is further configured to:
   iterate through each record of the temporary table; and
   execute the function for each contact entry identified in the temporary table by a selected toggle value.

17. The device of claim 11, wherein the function comprises a delete function.

18. The device of claim 11, wherein the function comprises assigning a picture.

19. The device of claim 11, wherein the function comprises assigning a ring tone.

20. The device of claim 11, wherein the function comprises sending an electronic business card.

21. A method for managing contact entries of an address book in a mobile communication device including a memory and a display, the method comprising:
   displaying a list of contact entries on the display;
   determining whether a multiple contact selection mode has been invoked for the mobile communication device;
   if the multiple contact selection mode has been invoked,
      activating a multiple contact selection mode that enables a multiple contact selection manipulation mode for the address book;

displaying a toggle value corresponding to each contact entry displayed on the display;

receiving a plurality of inputs, wherein each input is associated with selecting a particular toggle value for a particular contact entry;

receiving a command input to execute a function on the address book, wherein the command input is associated with the plurality of inputs; and executing the function associated with the command input for the plurality of inputs; and if the multiple contact selection mode has not been invoked, operating the mobile communication device in a single contact selection mode that enables a single contact selection manipulation mode for the address book.

* * * * *